United States Patent [19]

Parker et al.

[11] 4,427,433
[45] Jan. 24, 1984

[54] PRODUCTION OF GRANULAR AMMONIUM-POLYPHOSPHATE WITH AN INLINE REACTOR AND DRUM GRANULATOR

[75] Inventors: Byron R. Parker; Thomas R. Stumpe, both of Florence, Ala.

[73] Assignee: Tennessee Valley Authority, Muscle Shoals, Ala.

[21] Appl. No.: 414,689

[22] Filed: Sep. 3, 1982

Related U.S. Application Data

[63] Continuation of Ser. No. 358,396, Mar. 15, 1982, now Defensive Publication No. T102,601.

[51] Int. Cl.³ .............................................. C05B 1/06
[52] U.S. Cl. ......................................... 71/34; 71/43;
71/44; 71/64.05; 71/64.08; 423/305
[58] Field of Search ............... 71/34, 43, 64.08, 64.03,
71/51, 64.05, 44; 423/315, 305

[56] References Cited

U.S. PATENT DOCUMENTS

| | | | |
|---|---|---|---|
| T101,203 | 11/1981 | Parker et al. | 71/34 X |
| 3,649,175 | 3/1972 | Legal | 71/43 X |
| 3,734,708 | 5/1973 | Burns | 71/34 |
| 3,917,475 | 11/1975 | Moore et al. | 71/34 |
| 4,134,750 | 1/1979 | Norton et al. | 71/64.03 X |
| 4,211,546 | 7/1980 | Jensen | 71/34 |
| 4,337,079 | 6/1982 | Mann et al. | 71/43 X |
| 4,377,406 | 3/1983 | Achorn et al. | 71/43 X |

OTHER PUBLICATIONS

Weast; CRC Handbook of Chemistry & Physics, 62nd Ed.; 1981; p. F-107.

Primary Examiner—Kenneth M. Schor
Attorney, Agent, or Firm—Robert A. Petrusek

[57] ABSTRACT

Method for production of granular ammonium polyphosphate fertilizer in which ammonium polyphosphate melt is prepared in a simple inline reactor and distributed onto a bed of solids in a drum granulator to bind smaller fertilizer particles into granules. The desired polyphosphate content can be obtained in the granular product by adjusting the total heat input of the feed reactants to the reactor by means of energy conservation modifications to the system. Energy losses are controlled by use of a predetermined quantity of insulation so that varying amounts of the maximum theoretical heat input can be utilized to produce products of polyphosphate contents as desired. The quantities of insulation and the resulting heat inputs to the reactor have been identified which will produce the given critical polyphosphate content material, determined to be 12 percent of total phosphate as polyphosphate in a granular material, which will give 10 percent polyphosphate in a suspension fertilizer made from the granular material. No external heat is required and energy and production savings can be readily realized.

1 Claim, 6 Drawing Figures

FLOW DIAGRAM OF GRANULATION PILOT-PLANT FOR
PRODUCTION OF AMMONIUM POLYPHOSPHATE
USING THE PIPE REACTOR

FIG. 1

FLOW DIAGRAM OF GRANULATION PILOT-PLANT FOR PRODUCTION OF AMMONIUM POLYPHOSPHATE USING THE PIPE REACTOR

CONFIGURATION OF PILOT-PLANT PIPE REACTOR
FIG. 2

CONFIGURATION OF PILOT PLANT PIPE REACTOR
USING AN 8-INCH REACTION TUBE

EFFECT OF HEAT INPUT TO THE PIPE REACTOR ON PRODUCT POLYPHOSPHATE CONTENT

POLYPHOSPHATE SUSPENSION OF NOMINAL 11-33-0 GRADE

FIG. 6

PRODUCTION OF GRANULAR AMMONIUM-POLYPHOSPHATE WITH AN INLINE REACTOR AND DRUM GRANULATOR

The invention herein described may be manufactured and used by or for the Government for governmental purposes without the payment to us of any royalty therefor.

This application is a continuation of application Ser. No. 358,396, filed Mar. 15, 1982, for PRODUCTION OF GRANULAR AMMONIUM-POLYPHOSPHATE WITH AN INLINE REACTOR AND DRUM GRANULATOR now Defensive Publication No. T102,601, published Jan. 4, 1983.

INTRODUCTION

The present invention relates to methods for production of granular fertilizer; more particularly, the present invention relates to methods for the manufacture of granular phosphate fertilizers from ammonium phosphate melt produced in an inline reactor from ammonia and wet-process phosphoric acids, which melt serves to bond small fertilizer particles into granules; even more particularly, the present invention relates to methods for production of ammonium phosphate fertilizers which contain part of the phosphate present therein in the polyphosphate form; and still more particularly, the present invention relates to methods of production of ammonium phosphate fertilizers and fertilizer intermediates which contain critically sufficient minimum polyphosphate, said minimum polyphosphate effected by adjustments of the degree of reactor heat input and said minimum polyphosphate sufficient to improve storage and physical characteristics and also to enable the subsequent production of fluid suspension fertilizers produced therefrom with unusually excellent physical characteristics while utilizing a process that is more energy efficient than those disclosed in the prior art and thus can be operated more economically.

BACKGROUND OF THE INVENTION

1. Field of the Invention

Ammonium phosphates produced by the reaction of ammonia with phosphoric acid became the leading phosphatic fertilizers produced in the United States in the late 1960s and since that time their manufacture and use have continued to increase. Both diammonium and monoammonium phosphates are commonly produced. Initially both of these fertilizers were produced using a slurry type process such as that taught in U.S. Pat. No. 3,153,574, Achorn et al, assigned to the assignee of the present invention, which was designed principally for production of diammonium phosphates. Other processes were developed that offered distinct advantages when producing monoammonium phosphates. These processes involved a new technique of granulation called melt granulation in which an inline type reactor, such as a pipe reactor or pipe-cross reactor, was used to produce an essentially anhydrous ammonium phosphate melt. This allows much better conservation of heats of reaction and thus reduces or totally eliminates any drying requirement or step during subsequent treatment of fertilizer material exiting the granulator. Cost savings are realized because fuel requirement for heating is decreased and capital investment requirements are also decreased because complicated slurry production and handling equipment, such as a preneutralizer, and drying equipment are no longer required. Thus, in summary, operating costs are decreased because not only fixed but also variable expenses are decreased.

2. Description of the Prior Art

Several processes have been developed using the melt granulation technique including those taught in U.S. Pat. No. 3,825,414, Lee et al, assigned to the assignee of the present invention, where a pug mill granulator is used; in U.S. Pat. No. 3,985,538, Hicks et al, also assigned to the assignee of the present invention, where a drum granulator is used, but a preneutralizer is also used in the reaction system. There are certain inherent disadvantages to these two processes, however. The former process used not only a complicated reaction system that included a spray reactor and vapor disengager in addition to the pipe reactor, but also used a pug mill granulator which is typically more expensive to operate and maintain than a drum granulator and is much less commonly used in the fertilizer industry. The latter process used a drum granulator but also had a much more complicated reaction system whereby a preneutralizer tank is also included with the pipe reactor.

Later processes were developed that were more suited to production of ammonium phosphate fertilizers in drum granulators. In U.S. Pat. No. 3,954,942, Achorn et al, assigned to the assignee of the present invention, taught the use of a pipe-cross reactor as the reaction system. With this type of inline reactor, sulfuric acid can also be fed and co-neutralized along with the phosphoric acid inside the reactor so that a fertilizer can be produced that contains additional sulfate, if needed. This process was improved, as taught in U.S. Pat. No. 4,134,750, Norton et al, assigned to the assignee of the present invention. Norton et al modified the earlier process of Achorn, supra, so that higher temperatures could be maintained in the pipecross reactor and ammonium phosphate fertilizers containing polyphosphate were produced. Although both the Achorn and Norton processes, to wit, '942 and '750, supra, obtain a granular product without external heat; both utilize sulfuric acid fed to the pipe-cross reactor to furnish the required and necessary additional chemical heat to the process.

The Lee process, to wit, U.S. Pat. No. 3,825,414, supra, produced a product in which a 20-percent polyphosphate content was the minimum acceptable for granular material which is intended to be subsequently used as an intermediate for production of suitable suspension fertilizers. In this process, a pug mill granulator was used. This type of granulator has not been well accepted by the granular fertilizer industry. The pug mill is a complicated piece of granulation equipment and because of this it has a higher investment cost than other more common granulators, such as a drum granulator, and is more difficult to maintain in good operating condition, thus increasing maintenance costs. Since more energy, especially electrical energy, is required to operate the pug mill, operating costs are further increased. Because a pug mill cannot be easily or readily hooded, it is more difficult to scrub the fumes from a pug mill and pollution control is more expensive. Investment costs and operating costs are higher because of the use of the pug mill granulator and because of the more complicated reaction system comprising a spray reactor, vapor disengager, and pipe reactor. For a better understanding of the theory, construction, and operation of the spray reactor and vapor disengager, see FIGS. 5 and 6 of U.S. Pat. No. 3,733,191, Meline et al, assigned to the assignee of the present invention, in which the spray reactor is referred to as the first-stage reactor and the vapor disengager as a horizontal tube and rotor-type disengager. The spray reactor must be operated at high temperatures and low pH so that the material of construction is a material such as Hastelloy G that is not normally used in the industry, especially for large pieces of equipment, because of its high costs. The vapor disengager is a rather complicated piece of equipment to operate and is considered by some to be above the normal state of the art practiced by the industry. Parts of this vapor disengager would be expected to require an expensive material of construction. In addition, maintenance costs are high because of the rotary nature of the disengager and close tolerances maintained so that highly skilled maintenance personnel are required.

SUMMARY OF THE INVENTION

The novelty of the present invention resides in the fact that granular ammonium polyphosphate fertilizers are produced without external heat with an inline reactor and drum granulator and that predetermined product polyphosphate contents can be obtained. External heat is used herein in the sense to mean heat supplied to the system in addition to the latent and potential chemical heat contained therein as, for example, that supplied by burning fossil fuel or by adding additional chemical such as in the case of a side stream of sulfuric acid to the reactor, as in Achorn or Norton, supra, or even by adding additional preheat to bolster the amount of latent heat in the system. Practices of the instant invention are accomplished by control of the net heat input of the phosphoric acid and ammonium feed materials to the reactor by predetermining the insulation required for selected equipment to control heat losses therefrom. Since a miximum theoretical heat input is available, the net heat input to the reactor can be adjusted by increasing or decreasing process reaction system heat losses. The present invention not only identifies the parameters for producing products of various polyphosphate contents, but has identified that the minimum polyphosphate content required in granular products for producing suspensions is only 12 percent. Specifically, the process of this invention uses a reaction system and scrubbing system in which the scrubber and reactor and their auxiliary feed and drain lines are heavily insulated. Air ducts to the scrubber are also insulated, which allows the polyphosphate content of the granular product to be predetermined by control of the heat losses from the process by the quantity of insulation used so that varying amounts of the theoretical maximum process heat input can be utilized.

ADVANTAGES OF THE INVENTION

Developments in fertilizer use and application have shown that there are definite advantages for a granular ammonium polyphosphate fertilizer as compared with a granular monoammonium phosphate fertilizer. Ammonium polyphosphate fertilizers exhibit improved physical characteristics. Because chemical water is removed as polyphosphates are formed, ammonium polyphosphate fertilizers exhibit better storage and physical properties because the polyphosphate can absorb some water and hydrolyze back to the orthophosphate form and this buffering action lessens the tendency for the material to become wet or sticky because of ambient environmental conditions. The materials containing polyphosphate are also harder, smoother, and less dusty; hence, the storage properties thereof are improved. The material can also be used as an intermediate in granulation plants. The material has a high phosphate and total plant nutrient content and can be shipped to granulation plants at cheaper rates than fluid forms of phosphate such as phosphoric acid. The material is readily used to make bulk blends of solid material fertilizers and again is an excellent phosphate source because of its high concentration of plant nutrients. And lastly, but perhaps most importantly, such ammonium polyphosphate granular fertilizer material is an excellent intermediate material for producing fluid suspension fertilizers. The polyphosphate present in the ammonium polyphosphate is very important when producing a suspension fertilizer from an intermediate granular material. The presence of polyphosphate prevents gelation of iron and aluminum compounds generic with the wet-process phosphoric feed acid and allows production of higher grades, which in turn gives the advantages of lower shipping costs and lower storage costs. Fluid suspensions having lower viscosities can be produced and these suspensions have lower solidification temperatures which allow use and storage in colder climates. Polyphosphate containing material will also dissolve more quickly than monoammonium phosphate material resulting in higher production rates and subsequently lower manufacturing costs.

In the past it has been well established that it is most desirable to have at least about 20 percent phosphate of the solid intermediate in the polyphosphate form. One of the discoveries underlying the inventive concept of the present invention is that lower quantities of polyphosphate are sufficient to make acceptable storing suspensions. We have found that suspensions containing as little as 10 percent of the phosphate in polyphosphate form perform well. This requires a 12-percent polyphosphate granular intermediate material since about 2 percent polyphosphate is hydrolyzed during manufacture of a suspension fertilizer therefrom. Under these conditions, a nominal 11-33-0 grade material can be made that will store acceptably for at least 60 days at 80° F. and have a solidification temerature of at least −5° F., or below. This is in direct comparison to a suspension made from monoammonium phosphate which will have a maximum grade of only 9-27-0 or sometimes even 8-24-0 when the solid granular intermediate orthophosphate material has a grade less than 11-55-0. Suspensions produced from said orthophosphate intermediates have acceptable storage properties for 60 days at 80° F., but have a solidification temperature greater than 0° F. Studies show a solidification temperature of −5° F., or less, is required for suitable storage, transport, and application in areas of the northern United States (see "New Developments in Fertilizer Technology," 13th Demonstration, Oct. 7–8, 1980—TVA Bulletin Y-158).

OBJECTS OF THE INVENTION

It is therefore an object of the present invention to provide an improved method of producing a granular ammonium polyphosphate fertilizer whereby the specific critical minimum content of polyphosphate as desired or required can be obtained.

Another object of the present invention is to provide the critical ammonium polyphosphate content of suspension intermediate material while employing the old standby, to wit, the inclined rotating drum granulator and the inline single-stage reactor with resulting lower energy and production costs because of energy conservation methods utilized therein.

A further object of the present invention is to provide a granular ammonium polyphosphate fertilizer material that exhibits superior physical properties (i.e., harder, smoother, and less dusty) and that is ideally suited for use as a solid granulation intermediate product for subsequent production of fluid suspension fertilizers, thus reducing costs since solid intermediates can be shipped cheaper on a per unit of plant food basis than the fluid intermediates that would otherwise normally be used. The critical minimum polyphosphate content for the process of our invention is about 12 percent polyphosphate in the granular material used as an intermediate to produce a suspension containing the required minimum 10 percent polyphosphate.

Still further and more general objects and advantages of the present invention will appear from the more detailed description set forth below, it being understood, however, that this more detailed description is given by way of illustration and explanation only and not necessarily by way of limitation since various changes therein may be made by those skilled in the art without departing from the true spirit and scope of the present invention.

Thus the novelty of the present invention resides in a new method of producing granular ammonium polyphosphate fertilizer materials having a predetermined critical minimum content of polyphosphate required for the particularly desired end use, said method effected in a common drum type granulator utilized in conjunction with a single-stage inline reactor, said method characterized by the fact that substantially no external heat energy need be applied thereto.

DESCRIPTION OF THE DRAWINGS

The present invention, together with further objects and advantages thereof, will be better understood from a consideration of the following description taken in connection with the accompanying drawings in which.

DESCRIPTION OF THE PREFERRED EMBODIMENTS

Figure 1:
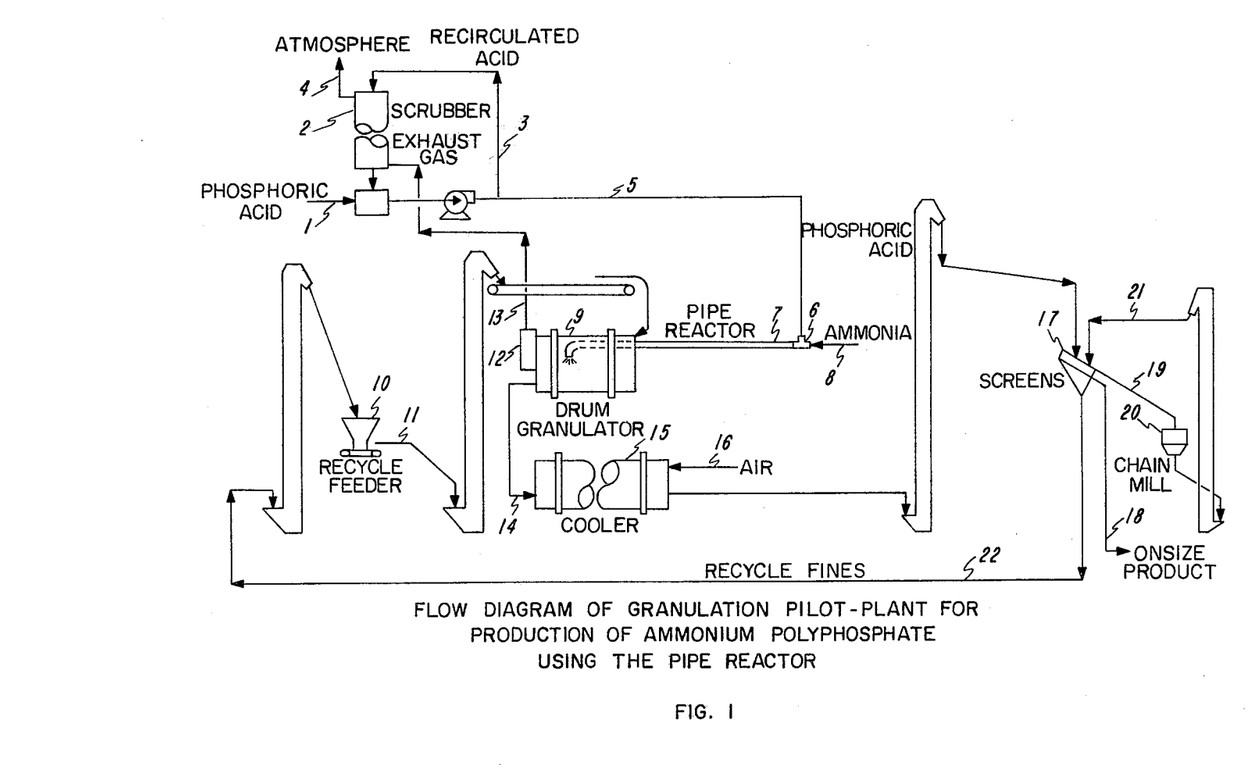
FIG. 1 is a flow diagram illustrating the principal novel process which results in a granular ammonium polyphosphate being produced in which the minimum polyphosphate content required can be effected.

Referring now more particularly to FIG. 1, a stream of wet-process phosphoric acid 1 from a source not shown is introduced into insulated granulator exhaust scrubber 2 wherein a portion thereof is recirculated via insulated line 3. Water vapor is discharged to the atmosphere via line 4. A side stream of phosphoric acid via insulated line 5 is fed into the pipe reactor shown and comprising standard pipe tee 6 followed by a length of insulated standard pipe 7 wherein said phosphoric acid reacts very rapidly with a stream of gaseous anhydrous ammonia fed from a source not shown via line 8 into pipe reactor 6 and 7. The melt reaction product from pipe reactor 6 and 7 discharges from insulated reaction tube 7 into insulated drum granulator 9, and coats particles of recycled finely divided product fed from recycle feeder 10 via line 11 and binds them together to form fertilizer granules. Drum granulator 9 is particularly suited to containment of the discharged vapors. The vapors discharging from pipe reactor 6 and 7 are contained by insulated hood 12 and exhausted by insulated duct 13 to insulated granulator exhaust gas scrubber 2. Granulator discharge stream 14 is fed to rotary cooler 15 wherein the fertilizer granules are contacted with airstream 16 for removal of sensible heat. The cooled material is subsequently introduced into size classifier screens 17. Onsize product is taken off via line 18. Oversize via line 19 is crushed in chainmill or similar crusher 20 and the resulting crushed material recycled to screens 17 via line 21. The undersize material from screens 17 is returned to granulator 9 via line 22. A more detailed description of the quantity and quality of insulation required on equipment pieces 2, 3, 5, 6, 7, and 12, supra, is defined in Example I below.

Figure 2:
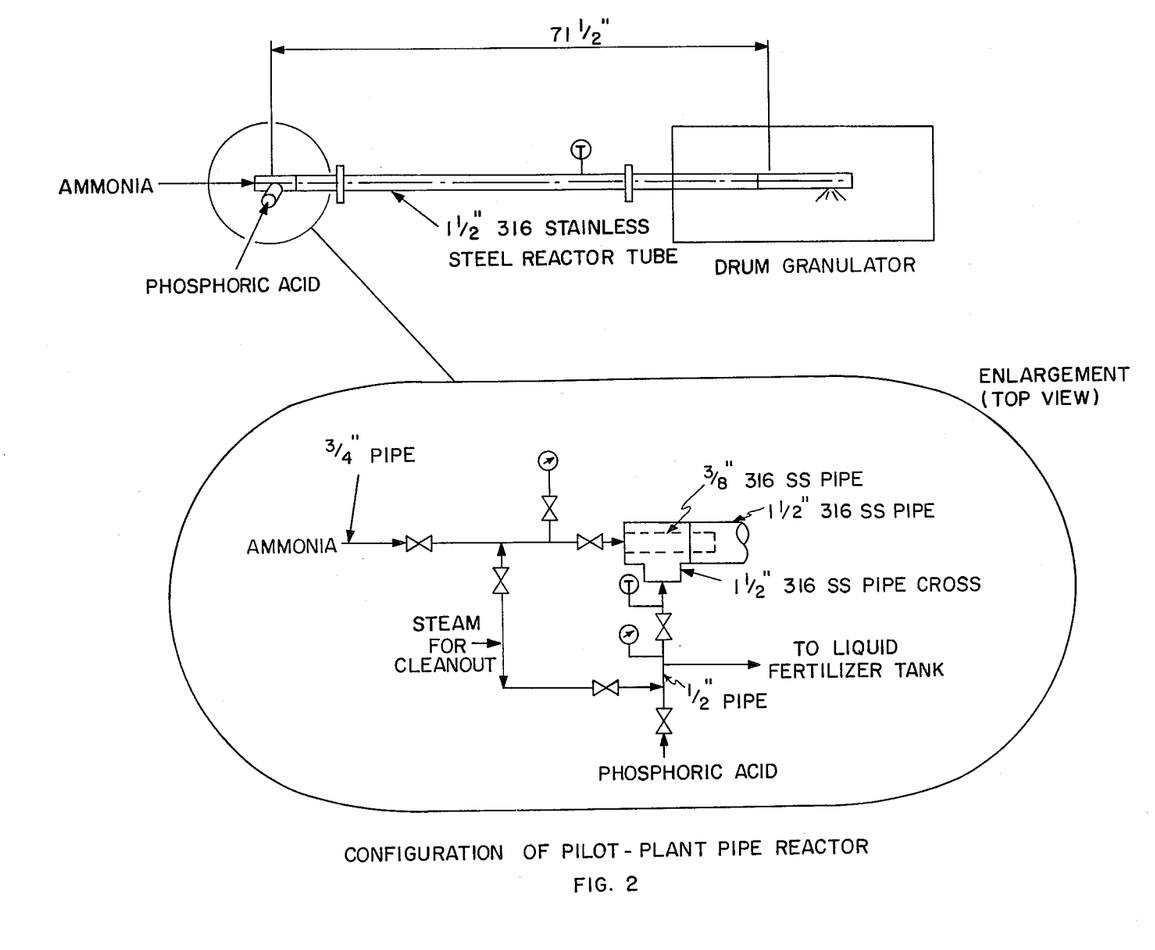
FIG. 2 is a sketch of a pipe reactor which uses a 1½-inch horizontal reaction tube made of Type 316 stainless steel.
Figure 3:
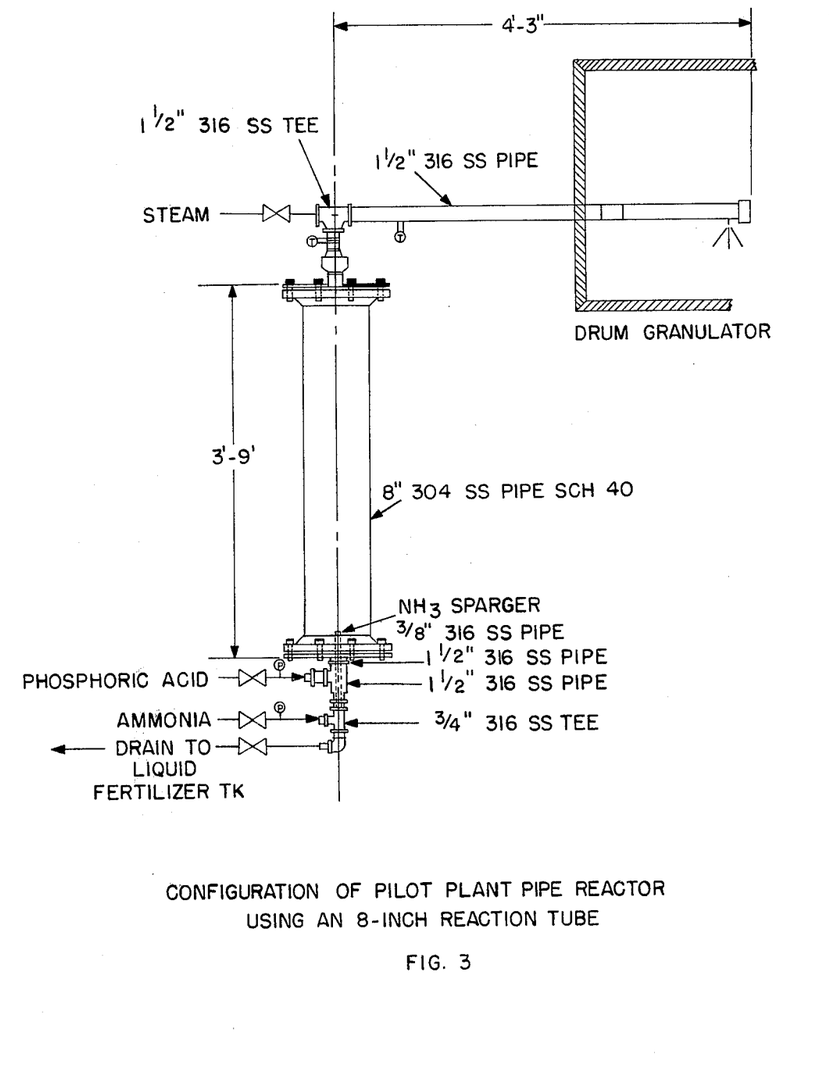
FIG. 3 is a sketch of a pipe reactor which uses a vertical 8-inch reaction tube.

Referring now more specifically to FIGS. 2 and 3, the reaction tube, a length of suitably corrosion-resistant pipe, is preceded by a standard pipe tee. Type 316 stainless steel is recommended. A horizontal pipe reaction tube configuration is shown in FIG. 2; a vertical configuration is shown in FIG. 3. The significance of the configurations and sizes can be better understood by examining Example I, infra.

Figure 4:
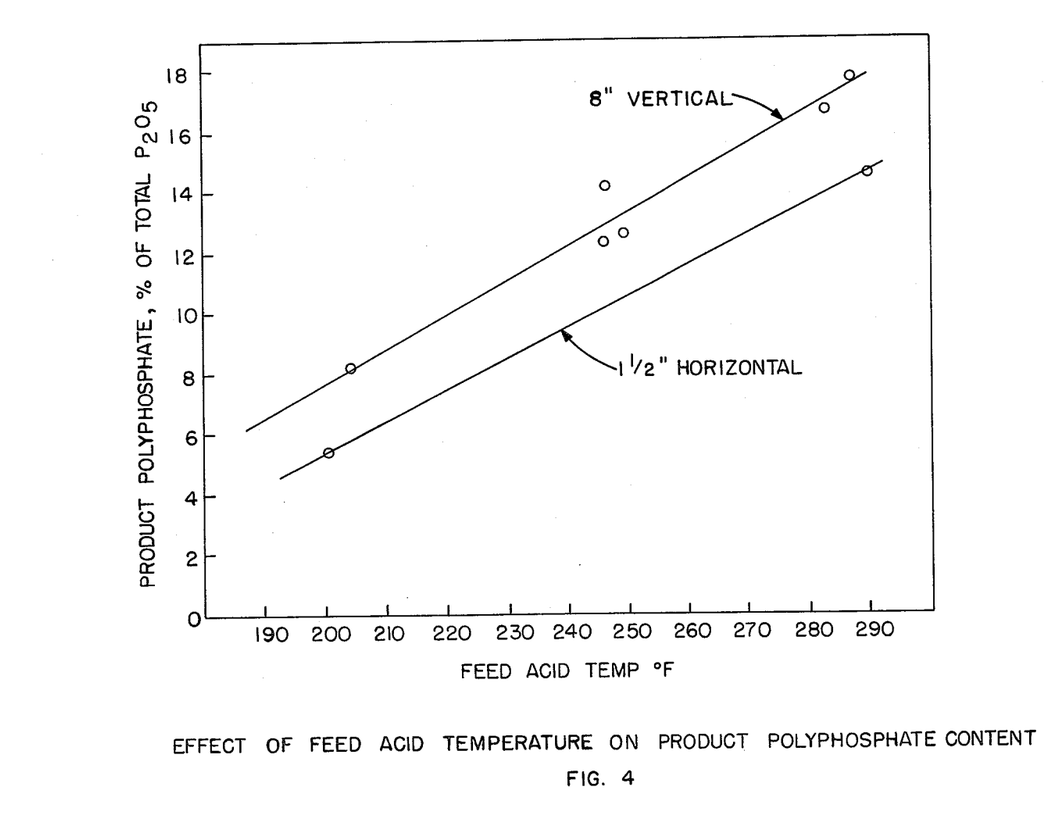
FIG. 4 represents a graphical plot of the relationship between granular product polyphosphate content to the temperature of the feed phosphoric acid fed to the inline reactor.
Figure 5:
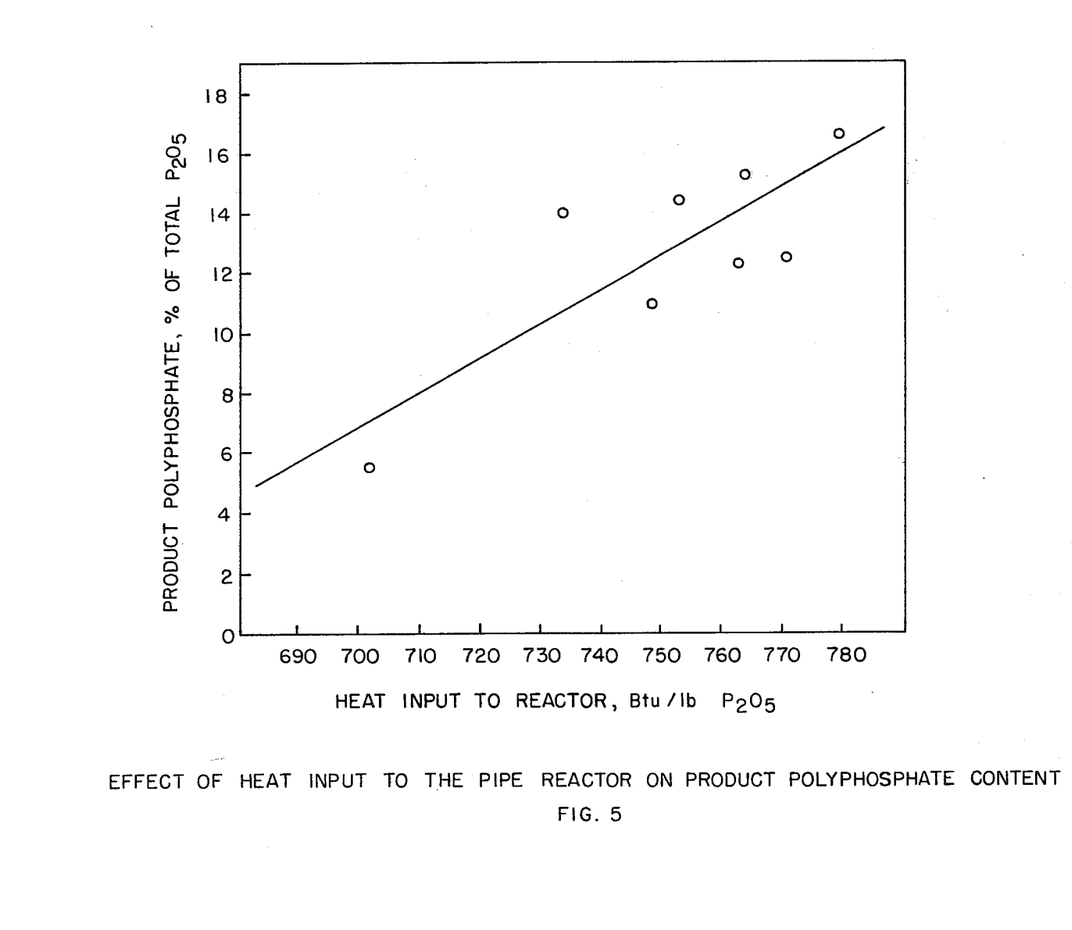
FIG. 5 represents a graphical plot of the relationship between the granular product polyphosphate content to the heat content of the input feeds to the inline reactors, including both sensible heats and heats of reaction.
Figure 6:
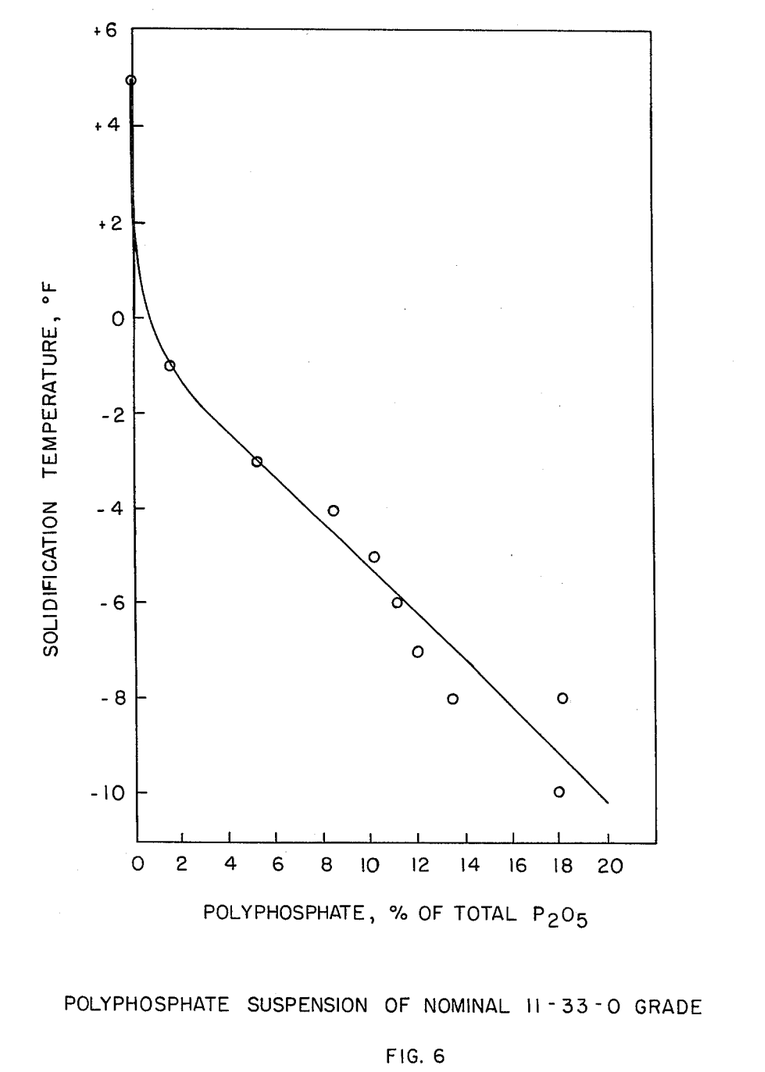
FIG. 6 represents a graphical plot of the relationship between the polyphosphate content and the solidification temperature for suspensions of a nominal 11-33-0 grade made from granular ammonium polyphosphate materials.

Referring now more specifically to FIGS. 4-6, the graphical relationships shown therein are better understood and appreciated when taken in conjunction with descriptions of various examples discussed infra. Accordingly, more detailed and specific discussion of FIGS. 4 and 5 are found in the discussion of Example I, infra, and detailed and specific discussion of FIG. 6 is found in the discussion of Example II, infra.

EXAMPLES

In order that those skilled in the art may better understand how the present invention can be practiced, the following examples are given by way of illustration and not necessarily by way of limitation.

EXAMPLE I

Several series of tests have been conducted on pilot-scale equipment. The granulation pilot plant had a nominal production capacity of 0.5 tons per hour of granular ammonium polyphosphate fertilizer material. The material was produced with a process that utilized a pipe reactor as the sole reaction system and a drum granulator. An ammonium polyphosphate melt was produced from reaction of anhydrous ammonia and wet-process phosphoric acid in the pipe reactor, and the resulting melt was subsequently distributed onto a bed of recycle solids in a drum granulator and the formation of granular material resulted with the granulator discharge product being cooled and sized and the undersized material returned as recycled solids to the granulator. An anomaly of this process is that a loss of polyphosphate occurs within said drum granulator which is not noticed when using another type of granulator--the pug mill. These tests were made in an effort to predict the polyphosphate contents of the product that could be obtained, this being otherwise difficult because of the polyphosphate losses that occur in process. A merchant-grade wet-process phosphoric acid was used in these tests. The average analysis (weight percent) of the feed acid was as follows:

Total $P_2O_5$—53.3,
$Al_2O_3$—1.6,
$Fe_2O_3$—1.5,
MgO—0.67,
F—1.0,
$SO_3$—2.9,
CaO—0.14,
Water-insoluble solids—2.1,
Total $H_2O$—17.9.

This information from the tests can be best assimilated if it is presented in summary graphical form, as shown in FIG. 4, which shows the polyphosphate contents obtained in granular ammonium polyphosphate product for various phosphoric acid feed temperatures to the reactor. External preheat was used for the higher temperatures solely and only for the purpose of defining invention parameters. We do not contemplate the use of external heat in the process to obtain the minimum critical polyphosphate. All heat is obtained from chemical heats of reaction. FIG. 5 shows that the information from FIG. 4 can be brought to a common basis and plotted as product polyphosphate content versus the total heat input to the reactor where the sensible heats of the feed phosphoric acid and ammonia and the heat of reaction of the ammonia and phosphoric acid is included. This shows that for a given acid concentration, the polyphosphate content desired can be obtained by the addition of a given heat input to the reactor as dictated by the relationship given in FIG. 5. This heat is adjusted by the quantity of insulation which, by controlling the rate of heat losses, can maintain a given reactor heat input, since a maximum theoretical heat input is available to the process from chemical heats of reaction. In this series of tests, for example, a nominal 11-55-0 grade granular fertilizer is produced by neutralization reaction of gaseous ammonia and phosphoric acid where an $NH_3:H_3PO_4$ mole ratio of 1.0 was maintained. The total heat available from the chemical reaction is 795 Btu/pound $P_2O_5$ for a heat of reaction value of 3284 Btu/pound of ammonia reacted. The reactants are at ambient temperatures and the sensible heat is considered negligible because a zero heat enthalpy datum base of 70° F. is used, so the total heat available to the process is equivalent to the total chemical heat of reaction. As shown specifically in FIG. 5, to obtain the minimum critical polyphosphate content of 12 percent, insulation of a predetermined R-value is used which is sufficient to reduce the heat losses so that of the total theoretical heat of 795 Btu/pound $P_2O_5$ only 50 Btu/pound $P_2O_5$ of heat is lost from the reaction and scrubbing systems resulting in a net heat input to the reactor of at least 745 Btu/pound $P_2O_5$. As the $NH_3:H_3PO_4$ mole ratio is increased from 1.0 upwards to 1.25, which represents the total range through which effective and desirable granulation of the polyphosphate material can be achieved, the total theoretical heat available in the process ranges from 795 Btu/lb $P_2O_5$ upwards to 902 Btu/lb $P_2O_5$. Thus, with a required net heat input to the reactor of at least 745 Btu/lb $P_2O_5$, the present invention, when operating at a $NH_3:H_3PO_4$ mole ratio of 1.25, would allow a heat loss of upwards of 157 Btu/lb $P_2O_5$. Another way of looking at this is pointed out infra in the example wherein in an installation having the proper amount of heat conservation measures, to wit, insulation on the reactor, granulator, scrubber, and feed and drain lines, to yield a 12-percent polyphosphate product when operated at a $NH_3:H_3PO_4$ mole ratio of 1.0, will yield a product having higher amounts of polyphosphate as the mole ratio of ammonia to acid is increased upwards to about 1.25. Since the heat of reaction value for ammonia throughout this range is constant, both the increase in polyphosphate points or the increase in amount of heat loss allowable is approximately linear.

Although the pipe reactor itself will operate very well at $NH_3:H_3PO_4$ mole ratios up to 1.5, when the pipe reactor is included in a granulation process, it is not desirable to operate the pipe reactor at $NH_3:H_3PO_4$ mole ratios above about 1.25 because ammonia evolution from the pipe reactor and the granulator increases very rapidly as the mole ratio is increased and this ammonia must be removed in a scrubber, which subsequently must be larger and more expensive. Additionally, as the mole ratio increases, the solubility of the resultant product also increases rapidly so that granulation is effected detrimentally and a larger rate of recycled solids must be supplied to maintain granulation. Larger, more expensive transfer equipment is consequently required.

In this particular series of tests, a drum granulator 3 feet in diameter and 6 feet long, insulated with 1 inch of rigid calcium silicate, was used. A pipe reactor with an insulated 1½-inch-diameter pipe reaction tube, as shown in FIG. 2, was used. One inch of rigid calcium silicate insulation was used. The fumes and dust from the drum granulator and the reactor discharge inside the drum granulator were pulled by a fan-induced draft through an 8-inch diameter duct (heat transfer surface area of 29 ft²) insulated with a 1½-inch thickness of calcium silicate, and into the scrubber. The ammonia present in the exhaust stream, usually less than 10 percent of the total ammonia fed to the process, was removed as it reacted with the recirculating stream of phosphoric acid in the scrubber. The scrubber used was a vertically oriented packed bed scrubber which was 2 feet in diameter and 10 feet high (total heat transfer surface area of 69 ft²) and insulated with a 1½-inch thickness of calcium silicate insulation. A 15-inch diameter and 18-inch high seal tank (7 ft² of heat transfer surface) was installed underneath the scrubber so that no air in leakage would occur as the recirculating phosphoric acid scrubbing media exited the bottom of the scrubber. This seal tank was also insulated with a 1½-inch thick layer of calcium silicate, as were the 1-inch diameter pipes used to feed acid to the scrubber and the 1¼-inch diameter drain line in which the phosphoric acid exiting the bottom of the scrubber drained back to a holding tank from which acid was pumped back to the scrubber and a side stream of acid fed to the reactor. These lines had a total heat transfer surface area of 54 ft². The acid feed lines to the reactor were ½-inch diameter and comprised a total length of about 106 feet. Of the total 23 ft² of heat transfer surface area of these acid feeds, 17 ft² was insulated with a 1-inch thickness of calcium silicate. The pipe reactor to which the phosphoric acid was fed had a total heat transfer surface area of 3 ft² and was also insulated with a 1-inch thickness of calcium silicate. These thicknesses of insulation were not necessarily the ideal thicknesses required since the tests were structured so as to define the parameters of the process. In some instances, as mentioned previously, external heat was added to the process to define upper limits of the parameters. It was discovered from the test data that the insulation required could be defined from the following relationship.

Heat loss from system=(Heat loss from scrubber system and acid feed and drain piping)+(Heat loss from reactor)+(Heat loss from granulator shell)

This can be shown as the following equation:

$$(Q_L)P \cdot w_{P_2O_5} = k/x[A_1(T_1-T_A)+A_2(T_2-T_A)+A_3(T_3-T_A)]$$

where
$Q_L$=allowable heat loss as shown in FIG. 5, Btu/lb $P_2O_5$
$P$=production rate of product, lb/h
$w_{P_2O_5}$=weight fraction of $P_2O_5$ in product
$k$=thermal conductivity of insulation, Btu/(hr-ft$^2$-°F./inch thickness)
$x$=thickness of insulation, in.
$A_1$=heat transfer area of scrubber and acid feed and drain piping, ft$^2$
$A_2$=heat transfer area of reactor, ft$^2$
$A_3$=heat transfer area of granulator, ft$^2$
$T_1$=mean temperature of acid in scrubber and flow lines, °F.
$T_2$=mean temperature of reactor melt, °F.
$T_3$=mean temperature of granulator, °F.
$T_A$=ambient temperature For example for a 12 percent product polyphosphate a reactor heat input of 745 Btu/lb $P_2O_5$ is required. For this series of tests, a 1.0 $NH_3:H_3PO_4$ mole ratio was maintained and a theoretical maximum heat input was 795 Btu/lb $P_2O_5$. Since a heat loss of only 50 Btu/lb $P_2O_5$ could occur, the previous equation simplifies to $$50(700)(0.55) = k/x[232.5(175-80)+3(400-80)+56.5(200-80)]$$

where the ambient temperature was 80° F. and all values and units are appropriate as defined for the equation. Rearranging and solving this equation we find that the k/x term equals 0.645. Therefore, if calcium silicate, which, under conditions of this series of tests, has a thermal conductivity of 0.39 Btu/(hr-ft$^2$-°F.-inch thickness) is used, a thickness, x, of 0.6 inch is required. Although calcium silicate is used as an example, other types of insulating material could be used as long as the value of k/x for that insulation is 0.645. This equation can be used equally well for other production rates and for scaleup to larger size units since both production rate and total area for heat transfer are included. The ammoniation rate has a two-fold effect on polyphosphate content. The added heat of reaction obtained with a higher ammoniation rate increases the water removal in the pipe reactor, increases the melt temperature, and thus increases the polyphosphate content. Bench-scale pipe reactor tests showed that increasing the ammoniation rate from a reactant feed $NH_3:H_3PO_4$ mole ratio from 1.0 to 1.5 increased the polyphosphate content of the melt by 4 percentage points. Secondly, a higher ammoniation rate increases the pH of the granulator product and higher pH reduces polyphosphate losses by hydrolysis, thus increasing product polyphosphate contents. Pipe reactor feed $NH_3:H_3PO_4$ mole ratios in the range only up to 1.25 have been succcessfully tested in the pilot-scale granulation studies. Higher ratios exagerate scrubbing considerations, supra.

EXAMPLE II

Several granular product ammonium polyphosphate materials were produced that had various levels of polyphosphate contents. These materials were used as intermediates to produce fluid suspensions to test the effects of polyphosphate contents. In U.S. Pat. No. 4,066,432, Jones et al teach that the best suspensions are produced if the nitrogen to phosphate ratios are maintained in a range where the desired type of crystals are formed and which is at or near the point of maximum solubility. This corresponds to an $N:P_2O_5$ weight ratio of about 0.32-0.34, so all tests for comparison in the series were made at this ratio and the products had a nominal grade of 11-33-0.

The test data is summarized in FIG. 6 where solidification temperatures are given versus polyphosphate contents for various fluid ammonium polyphosphate suspensions. Viscosities of all suspensions were suitable. No suspension had a viscosity higher than 450 centipoises at 80° F. and 900 centipoises at 0° F. Solidification temperatures of −5° F. are needed in ammonium phosphate suspensions if they are to be used successfully in the northern United States; therefore, FIG. 6 is significant in that it shows that only about 10 percent polyphosphate as percent of the total $P_2O_5$ is required to obtain a solidification temperature of −5° F. Although higher polyphosphate contents are desired for lower solidification temperatures (for example, a 20 percent polyphosphate content suspension will have a −10° F. solidification temperature), the data indicate the minimum desired suspension polyphosphate content, as percent of total $P_2O_5$, is 10 percent. When suspension is made from intermediate granular ammonium polyphosphate, it is desirable to use the minimum acceptable polyphosphate content of granular material since any lowering of polyphosphate content results in reducing the heat input required for the manufacturing process, including eliminating the need for external heating. The tests indicate that 2 percentage points of polyphosphate content is lost during production of suspension from granular ammonium polyphosphate so that a granular ammonium polyphosphate product containing 12 percent polyphosphate as percent of the total $P_2O_5$ is recommended. FIG. 6 shows also that suspensions made from monoammonium phosphate without polyphosphate solidifies at much higher temperatures (+5° F.) as compared with suspensions containing the critical minimum polyphosphate directed by the present invention.

INVENTION PARAMETERS

After sifting and winnowing through the data supra, as well as other results of tests and operation of our new, novel, and improved method for production of granular ammonium polyphosphate fertilizer, we now present the acceptable and preferred parameters and variables.

Results of test data show that a granular ammonium polyphosphate product should contain a minimum of 12 percent polyphosphate as percent of the total $P_2O_5$ if it is to be used suitably as an intermediate in producing suspension fertilizers in the United States. Results also show that a process using an inline reactor and a drum granulator is suitable for producing the granular ammonium polyphosphate and that polyphosphate losses inherent in this process can be predicted and conditions maintained so that specific critical minimum polyphosphate contents desired can be maintained and produced. This can be accomplished by control of the heat input of the feed reactants to the reactor, as indicated by the resultant temperature of the reactor product to be granulated, by control of process heat losses by the heat conservation methods of insulation of scrubber, reactor, and related piping and ductwork of the reaction system.

The quantity and quality of insulation required can be determined by the equation given in Example I, supra. For a given type of insulation, the thermal conductivity is set and the given thickness, x, of that insulation can be calculated using the equation from Example I, supra, as rearranged and shown below:

$$x = \frac{k[A_1(T_1 - T_A) + A_2(T_2 - T_A) + A_3(T_3 - T_A)]}{Q_L \cdot P \cdot w_{P_2O_5}}$$

Once an installation of the process of this invention is defined, the heat transfer surface areas $A_1$, $A_2$, and $A_3$ can be determined. For a specific product grade formulation to be produced the production rate, P, and the phosphate fraction as $P_2O_5$, $w_{P_2O_5}$, are obtained. For the desired or required polyphosphate selected, the heat input to the reactor can be found in FIG. 6; the theoretical heat input is determined for the product grade formulation selected; and the difference between the two values is the allowable heat loss, $Q_L$. Now with the ambient temperature selected for design purposes or actual operating conditions and with the thermal conductivity, k, as set by the type insulation selected for study or use, all values are available for the right side of the equation and the insulation thickness, x, can be calculated. This is the required insulation thickness required on the various insulated pieces of equipment discussed in DESCRIPTION OF THE EMBODIMENTS, supra.

While we have shown and described particular embodiments of the present invention, modifications and variations thereof will occur to those skilled in the art. We wish it to be understood, therefore, that the appended claims are intended to cover such modifications and variations which are within the true scope and spirit of the present invention.

What we claim as new and desire to secure by Letters Patent of the United States is:

1. In an improved process for preparing granular ammonium polyphosphate fertilizers wherein
    A. a stream of wet-process phosphoric acid and a stream of anhydrous ammonia is introduced into an inline reactor to produce therein a resulting melt reaction product;
    B. at least a portion of said molten reaction product is withdrawn from said inline reactor and introduced onto a bed of particulate granular ammonium phosphate fertilizer maintained in a rotating horizontally inclined drum granulator;
    C. at least a portion of said material comprising said bed of particulate granular ammonium phosphate fertilizer material maintained in said rotating horizontally inclined drum granulator is removed from said drum granulator and introduced first into cooling means and subsequently into sizing means for product recovery;
    D. the off-gases from said drum granulator are passed to scrubbing means wherein the ammoniacal values therein are removed and recovered via a phosphoric acid side stream which is fed back to the main stream of phosphoric acid;

the improvement for effecting a granular ammonium polyphosphate product having a minimum of 12 percent by weight of the $P_2O_5$ values therein in the form of polyphosphate, said minimum being sufficient to produce an intermediate granular material eminently suitable for the subsequent production of fluid suspension fertilizers having solidification temperatures below about $-5°$ F. and said minimum 12 percent polyphosphate content of said $P_2O_5$ values being effected without the requirement of the addition of external heat to said inline reactor and the attendant and ancillary drum granulator, scrubber, and feed and drain lines connecting said reactor, granulator, and scrubber, which improved process comprises the steps of:

(1) reacting said ammonia and said wet-process phosphoric acid in said inline reactor in an $NH_3:H_3PO_4$ mole ratio ranging from about 1.0 to about 1.25 to thereby provide a total theoretical heat input to said inline reactor ranging between about 795 Btu/lb $P_2O_5$ and about 902 Btu/lb $P_2O_5$;

(2) providing predetermined amounts of heat conservation measures to reduce the total heat loss from said pipe reactor, said drum granulator, said scrubber, and the connecting ancillary feed and drain lines therebetween to the range from about 50 to about 157 Btu/lb of $P_2O_5$, said total heat loss values being in dependent and proportional relationship to said values of total theoretical heat input in step (1) above, to thereby provide a net heat input to said inline reactor of at least 795 Btu/lb of $P_2O_5$; said predetermined amounts of heat conservation measures in the form of insulation over the heat exchange surfaces of said pipe reactor, said drum granulator, said scrubber, and said attendant and ancillary feed and drain lines therebetween being determined by the equation below:

$$x = \frac{k[A_1(T_1 - T_A) + A_2(T_2 - T_A) + A_3(T_3 - T_A)]}{Q_L \cdot P \cdot w_{P_2O_5}}$$

where
  $Q_L$ = allowable heat loss as shown in FIG. 5, Btu/lb $P_2O_5$
  P = production rate of product, lb/h
  $w_{P_2O_5}$ = weight fraction of $P_2O_5$ in product
  k = thermal conductivity of insulation, Btu/(hr-ft$^2$-°F./inch thickness)
  x = thickness of insulation, in.
  $A_1$ = heat transfer area of scrubber and acid feed and drain piping, ft$^2$
  $A_2$ = heat transfer area of reactor, ft$^2$
  $A_3$ = heat transfer area of granulator, ft$^2$
  $T_1$ = mean temperature of acid in scrubber and flow lines, °F.
  $T_2$ = mean temperature of reactor melt, °F.
  $T_3$ = mean temperature of granulator, °F.
  $T_A$ = ambient temperature; and (3) recovering as product granular ammonium polyphosphate from said sizing means, said product characterized by the fact that it has a minimum of 12 percent by weight $P_2O_5$ values therein in the form of polyphosphate, said polyphosphate being sufficient to produce an intermediate granular material eminently suitable for the production of fluid suspension fertilizers having solidification temperatures below about $-5°$ F.

* * * * *